United States Patent Office 3,197,456
Patented July 27, 1965

3,197,456
AZO-DYESTUFFS
Rudolf Kühne and Fritz Meininger, Frankfurt am Main, and Walter Noll, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed July 18, 1961, Ser. No. 124,821
Claims priority, application Germany, July 22, 1960, F 31,728
6 Claims. (Cl. 260—163)

The present invention relates to new azo-dyestuffs and to a process for preparing them; more particularly it relates to dyestuffs corresponding to the following general formula

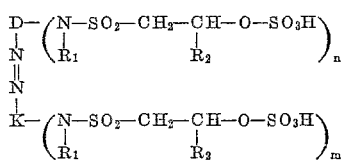

wherein $R_1$ and $R_2$ represent hydrogen atoms or lower alkyl radicals containing 1 to 5 carbon atoms, D represents an aromatic radical which may contain azo-groups, and K represents the radical of a coupling component, $n$ stands for one of the integers 0, 1 or 2, $m$ stands for 0 or 1, the sum of $n$ and $m$ being at least 1.

We have found that valuable new azo-dyestuffs are obtained by coupling aromatic diazo-diazoazo or tetrazo compounds with coupling components, whereby both components may contain groups imparting solubility in water, for example sulfonic acid or carboxylic groups, and whereby at least one of the two components contains one or more ethionylamino groups which may be bound to the dyestuff molecule directly or through an aliphatic bridge member and correspond to the following formula

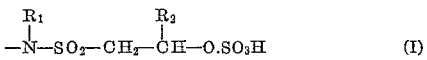

whereing $R_1$ and $R_2$ represent hydrogen atoms or lower alkyl radicals containing 1 to 5 carbon atoms. The dyestuffs may, therefore, be regarded as derivatives of ethionic acid amide or as derivatives of isethionic acid amide esterified with sulfuric acid.

The dyestuffs obtainable by the present invention correspond to the general formula $$D-N=N-K \quad (2)$$

wherein D represents an aromatic radical which may contain azo groups and K represents the radical of a coupling component, and whereby at least one of the two radicals D and K contains one or more ethionylamino groups of the Formula 1. In the dyestuff molecule the ethionylamino group may be bound to the radical K of the coupling component or advantageously to the radical D of the diazo component or to both components, directly or through an aliphatic bridge member, for example through an alkylene radical, such as $CH_2$.

In addition to one or more ethionylamino groups imparting solubility in water, the dyestuffs obtainable by the process of this invention contain either no further substituent imparting solubility in water or at least one acid group imparting solubility in water, for example a carboxylic group or especially a sulfonic group. With the inclusion of the ethionylamino group, the dyestuffs contain advantageously more than one group imparting solubility in water per azo group, i.e. at least two such groups in a monoazo-dyestuff molecule and at least three groups imparting solubility in water in a disazo-dyestuff molecule. These solubilizing groups may be distributed optionally in the dyestuff molecule.

Dyestuffs containing one or more ethionylamino groups in the diazo component only may be prepared by diazotizing a N-ethionylamino-arylamine and coupling the diazo compound with any compound capable of coupling. By N-ethionylaminoarylamines which may be prepared by the reaction of carbylsulfate and nitroarylamines and subsequent catalytic reduction of the nitro-aromatic compounds obtained, there are understood compounds having the following general formula

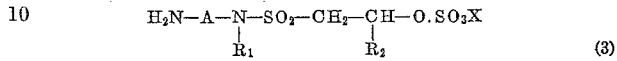

wherein $R_1$ and $R_2$ represent hydrogen atoms or lower alkyl radicals containing 1 to 5 carbon atoms, and X represents a hydrogen atom or advantageously an alkali metal ion, and wherein A represents, for example a radical of the benzene, naphthalene, diphenyl, diphenylamine, diphenylsulfone, stilbene, diphenyl thioether or diphenyl ether series. The aryl group A may contain any substituents, for example alkyl groups, such as methyl; halogen atoms, such as chlorine or bromine; acylamino groups, such as acetylamino; alkoxy groups, such as methoxy or hydroxy, carboxylic or sulfonic acid groups.

As N-ethionylamino-arylamines which may be used as diazo components, there may be mentioned, for example, the alkali metal salts or the free acids of the following compounds:

(A)

4-N-ethionylamino-1-aminobenzene,
3-(N-methyl-N-ethionylamino)-1-aminobenzene,
3-(N-methyl-N-ethionylamino)-4-methoxy-1-aminobenzene,
3-N-ethionylamino-4,6-dichloro-1-aminobenzene,
3-(N-butyl-N-ethionylamino)-1-aminobenzene,
4-amino-2-N-ethionylamino-1-methylbenzene,
3-amino-1-(2'-n-hexyl-N-ethionylamino)-benzene,
3-N-ethionylamino-1-aminobenzene-6-sulfonic acid,
4 (N-ethyl-N-ethionylamino)-2-amino-1-hydroxybenzene,
4-N-ethionylamino-2-aminobenzene-1-carboxylic acid,
4-(N-cyclohexyl-N-ethionylamino)-1-aminobenzene,
4-N-ethionylamino-aniline-2-sulfonic acid-N'-ethylanilide,
1-N-ethionylamino-5-N'-ethyl-(4'-amino-benzoylamino)-naphthalene,
3,5-di-(N-ethionylamino)-1-aminobenzene,
2-N-ethionylamino-4-amino-diphenylamine,
1-N-ethionylamino-5-amino-naphthalene,
4-N-ethionylamino-2-amino-acetophenone,
4-N-ethionylamino-4'-amino-diphenylether,
4-N-ethionylamino-4'-amino-3,3'-dichlorodiphenyl,
4-N-ethionylamino-4'-amino-diphenyl urea,
4-amino-3-(N-ethyl-N-ethionylamino)-4'-carboxydiphenylether,
2,4'-di(N-methyl-N-ethionylamino)-4-aminoazobenzene,
4-(N-methyl-N-ethionylamino)-1-aminobenzene or the arylamines obtainable by condensing aromatic amines containing one or more N-ethionylamino groups with nitrobenzoyl chlorides or nitrobenzene sulfochrolides and subsequent reduction, for example, the compounds of the formula

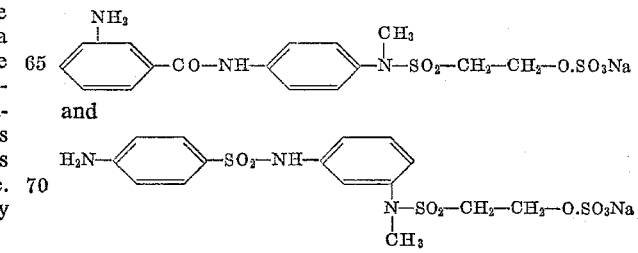

The N-ethionylamino-arylamines can easily be diazotized under the usual conditions and converted into N-ethionylamino-aryl-diazonium salts without secondary reactions taking place, such as hydrolysis of the ethionylamino group with splitting off of sulfuric acid or isethionic acid. The diazotization of the N-ethionylamino-aryl-amines which are advantageously used in the form of the alkali metal salts is carried out in an aqueous medium and preferably at a temperature below 20° C., for example, at a temperature between 0° C. and 10° C. For the diazotization of difficultly soluble N-ethionylamino-arylamines it is advantageous to use a water-soluble organic solvent, such as acetone or dimethyl formamide. The diazotization can also be carried out indirectly by dissolving the N-ethionylamino-arylamine in an aqueous alkali nitrite solution and introducing the mixture into acids. The N-ethionylamino-aryl-diazonium salts obtained correspond to the following formula

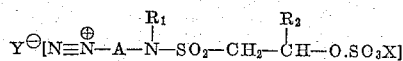

or

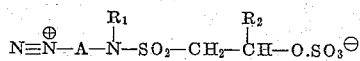

wherein A, $R_1$, $R_2$ and X have the meanings indicated above, and Y stands for the monovalent radical of a strong inorganic acid.

For the preparation of the azo-dyestuffs according to the present invention, the diazotized N-ethionylamino-arylamines are coupled with compounds capable of coupling according to their composition in an acid, neutral or alkaline solution, preferably at a pH-value as low as possible in order to perform a sufficient coupling and to prevent secondary reactions, for example, the splitting off of sulfuric acid with the formation of vinylsulfonylamides. The azo-dyestuffs obtained are isolated at a pH-value between 6 and 8 from the medium in which they are formed. As coupling components there may be used any compounds capable of coupling which may be free from ethionylamino groups and which, preferably, contain groups imparting solubility in water, such as carboxylic or sulfonic groups, for example:

(B)

β-ketocarboxylic acid esters or amides which are capable of coupling in α-position, for example acetoacetic acid arylides pyrazolones, especially 5-pyrazolones coupling in 4-position, such as 3-methyl-5-pyrazolone, 1-phenyl-3-methyl-5-pyrazolone, 1-(2'-, 3'- or 4'-sulfophenyl)-3-methyl-5-pyrazolone, 1-phenyl-5-pyrazolone-3-carboxylic acid, 5-pyrazolone-3-carboxylic acid amides, 1-(6'-chloro-2'-methyl-4'-sulfophenyl)-3-methyl-5-pyrazolone, furthermore phenols and hydroxyquinolines, such as 8-hydroxyquinoline, salicylic acid, furthermore diaminobenzene-sulfonic acids, such as 1,3-diaminobenzene-4-sulfonic acid, α- or β-naphthols, α- or β-naphthylamines, especially, however, amino, aminohydroxy and hydroxynaphthalene-sulfonic acids or the N-alkyl-, N-aryl- or N-acyl derivatives thereof, such as 1-hydroxy- or 2-hydroxy-naphthalene-monosulfonic acids or 1,8-dihydroxynaphthalene-3,6-disulfonic acid, 2-amino-naphthalene-6-sulfonic acid, 1-amino-8-hydroxynaphthalene-2,4, -3,6- or 4,6 disulfonic acid and the N-acyl derivatives of amino-hydroxynaphthalene-sulfonic acids, such as 1-acetylamino- or 1-benzoylamino-8-hydroxynaphthalene - 3,6 - disulfonic acid. Furthermore, there may be used as coupling components 2,3-hydroxynaphthoic acid and 2,3-hydroxynaphthoic acid arylides or 2,3-hydroxycarbazole-carboxylic acid arylides or 2-hydroxydiphenylene oxide-3-carboxylic acid arylides in which the arylide group may contain any substituents, 5,5'-dihydroxy-2,2'-dinaphthyl urea-7,7'-disulfonic acid which may be coupled twice with the diazo components mentioned like the 1-amino-8-hydroxynaphthalene-3,6-disulfonic acid and, furthermore, the condensation products from copper or nickel-phthalocyanine sulfochlorides with aminophenyl-methylpyrazolones or acylacetic acid arylides containing amino groups (German Patent No. 1,044,309). Coupling products with primary amines which may contain groups imparting solubility in water, such as sulfonic acid groups, can be diazotized again and coupled with any coupling components to form disazo-dyestuffs.

For the preparation of azo-dyestuffs containing the ethionylamino group of the Formula 1 both in the coupling component and in the diazo component, the N-ethionylaminoarylamines of the Formula 3, for example the compounds cited sub (A) may be diazotized in the manner described above and the N-ethionylamino-aryl-diazonium salts so obtained may be coupled with coupling components containing at least one ethionylamino group.

As coupling components containing one or more ethionyl-amino groups there may be used, for example, compounds of the benzene or naphthalene series which are capable of coupling due to the presence of an amino group or of an aromatically bound hydroxyl group, furthermore ketomethylene compounds containing a methylene group capable of coupling which stands in a position adjacent to an enolizable keto group. The following coupling components may be used, for example:

(C)

3-(N-methyl-N-ethionylamino)-1-aminobenzene, 6-(N-methyl-N-ethionylamino)-1-methyl-3-aminobenzene and especially N-ethionylamino-hydroxynaphthalene-sulfonic acids, such as 1-N-ethionylamino-8-hydroxynaphthalene-3,6-disulfonic acid, 2-N-ethionylamino-5-hydroxy-naphthalene-7-sulfonic acid, 2-(N-methyl-N-ethionylamino)-8-hydroxynaphthalene-6-sulfonic acid, 2[4'-(N-methyl-N-ethionylamino) - benzoylamino] - 5-hydroxynaphthalene-7-sulfonic acid, furthermore, β-ketocarboxylic acid derivatives, particularly acetoacetic acid arylides and pyrazolones, such as 1-aceto-acetylamino-3-N-ethylaminobenzene, 1-acetoacetyl-amino-4-(N-methyl-N-ethionylamino)-benzene-3-carboxylic acid or 1-acetoacetylamino-4-(N-methyl-N-ethionylamino)-benzene-3-sulfonic acid, 1-(4'-N-methyl-N-ethionylaminophenyl) - 3 - methyl-5-pyrazolone or 1-(4'-N-methyl-N-ethionylaminophenyl)-5-pyrazolone-3-carboxylic acid, furthermore 2,3-hydroxynaphthoic acid arylides, such as 1-(2',3'-hydroxynaphthoylamino)-3-(N - methyl - N - ethionylamino) - benzene, also compounds corresponding to the formula

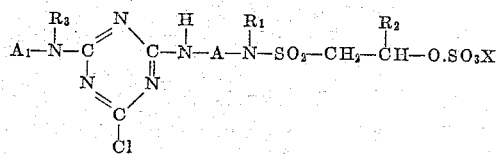

or

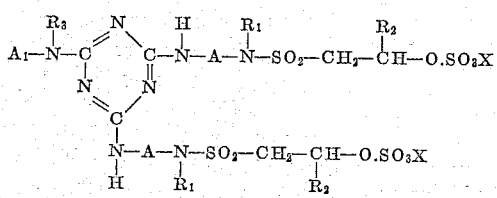

wherein $R_1$, $R_2$ and X have the meanings indicated above, $R_3$ stands for hydrogen or a lower alkyl group containing 1 to 5 carbon atoms, and wherein the group A represents a phenyl radical and the group $A_1$ an aryl radical capable of coupling, for example, a substituted phenyl or α- or β-naphthyl radical. In addition to hydroxyl and amino groups the aryl groups $A_1$ capble of coupling may contain further substituents, particularly sulfonic acid groups, which after coupling stand in ortho-position to the azo group. Suitable coupling components are obtained, for example, by condensing 1-hydroxy-2-aminonaphthalene-6-sulfonic acid or 1-hydroxy-8-amino-naphthalene-3,6-disulfonic acid or 1-hydroxy-6-N-methylaminonaphthalene-3-sulfonic acid with the reaction products from cyanuric chloride and 1 or 2 mols of 4-(N-methyl-N-ethylamino)-1-aminobenzene or 3-(N-ethyl-N-ethionylamino)-1-aminobenzene.

The azo-dyestuffs according to the present invention may also be prepared by coupling any diazo compounds which are free from ethionylamino groups with coupling components containing this group as substituent, for example, with the compound mentioned sub (C).

It is advantageous to select the diazotizable aromatic amine in such a manner that the finished dyestuff contains per azo group at least two groups imparting solubility in water, whereby one group imparting solubility in water may be an aromatically bound carboxylic or sulfonic group. Furthermore, these diazo compounds may be simple compounds, for example aminobenzene derivatives, aminobenzene sulfonic acids, aminonaphthalene sulfonic acids, aminonaphthol sulfonic acids or aminophenol sulfonic acids and also more complicated diazotizable compounds containing, for example, one or two azo groups in the molecule.

As aromatic amines the diazonium compounds of which are suitable for coupling with the coupling components mentioned which are substituted by the ethionylamino group, the following compounds may be used, for example: Aminobenzene, 2-, 3- or 4-methyl-1-aminobenzene, dimethylaminobenzenes, methoxy-aminobenzenes, such as 4-methoxy-1-aminobenzene, mono- or polychloro-aminobenzenes, 1-aminobenzene-2-, 3- or 4-sulfonic acids, 4-chloro-5-methyl-1-aminobenzene-6-sulfonic acid, 1-aminobenzene-2,5-disulfonic acid, 4-methyl-1-aminobenzene-2-sulfonic acid, 2,5-dichloro-1-aminobenzene-4-sulfonic acid, aminobenzene-carboxylic acids, such as 1-aminobenzene-3-carboxylic acid, 4-amino-diphenyl, aminodiphenyl sulfonic acids, such as 4-aminodiphenyl-3-sulfonic acid, aminonaphthalenes, such as 1-aminonaphthalene, aminonaphthalene sulfonic acids, such as 1-aminonaphthalene-4-sulfonic acid or 1-aminonaphthalene-3,6,8-trisulfonic acid, 1,3-phenylenediamine, aminohydroxy carboxylic acids, aminodiphenylethers, aminodiphenylsulfone, dehydrothiotoluidine, furthermore, 4-aminoazobenzene-3'-sulfonic acid, 4,4'-diaminodiphenyl, 4,4'-diamino-3,3'-dimethoxy-diphenyl or 4,4'-diamino-diphenyl urea.

In spite of the labile ethionylamino group, the dyestuffs obtained can be isolated and worked up to dry dyestuff preparations without losing their valuable properties. Their isolation is carried out at a temperature as low as possible by salting out and filtering or by evaporating the dyestuff solutions in vacuo. The drying operation is preferably carried out at temperatures which are not too high, i.e. at 40° to 65° C. and under reduced pressure.

The new dyestuffs obtainable by this invention are soluble in water. They are suitable for dyeing and printing various materials, such as wool, silk, leather, polyamides or polyurethanes according to the usual dyeing methods in a neutral to weakly acid bath, for example in the presence of ammonium acetate. The dyestuffs are especially suitable for dyeing and printing cellulosic materials, such as linen, regenerated cellulose and particularly cotton. The dyestuff is applied to the cellulose fiber by treating the material with an aqueous solution of the dyestuff in the presence of an acid binding agent, such as sodium hydroxide, sodium carbonate, sodium bicarbonate or trisodium phosphate, or with a printing paste with the addition of an acid binding agent, whereby the treatment with the acid binding agent may be carried out before, during or after the application of the dyestuff.

The new dyestuffs yield, in general, pure tints which are distinguished by good properties of fastness, especially by a good fastness to light and a very good fastness to wet processing.

The following examples serve to illustrate the invention but they are not intended to limit it thereto, the parts being by weight unless otherwise stated and the relationship of parts by weight to parts by volume being the same as that of the kilogram to the liter.

*Example 1*

18 parts of the potassium salt of 3-(N-methyl-N-ethionylamino)-1-aminobenzene of the formula

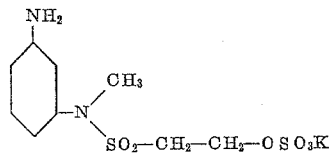

(obtainable by reacting 1-nitro-3-N-methylaniline with carbylsulfate and subsequent catalytic reduction, colorless crystal powder melting at 223–224° C.) are dissolved in the cold in 150 parts by volume of water; 30 parts by volume of 5 N-hydrochloric acid are added and the mixture is diazotized at 0–5° C. When the diazotization is complete, the pH-value of the solution is adjusted to 6–6.5 with sodium bicarbonate. A solution of 16.9 parts of 1-(2'-methyl-6'-chloro-4'-sulfophenyl)-3-methyl-5-pyrazolone and 8 parts of sodium hydroxide solution of 33% strength in 55 parts by volume of water is then added at 10° C. The whole is stirred for 1 hour and then mixed with 14 parts of crystallized sodium acetate. After coupling the dyestuff is salted out, filtered off and dried. A yellow powder is obtained which dissolves readily in water to give a yellow solution. By the usual dyeing methods the dyestuff yields on wool from a weakly acid bath in the presence of ammonium acetate yellow dyeings possessing very good properties of fastness. With printing pastes thickened with alginate with the addition of alkalies, such as sodium bicarbonate, sodium carbonate, trisodium phosphate or sodium hydroxide solution, yellow prints are obtained on cotton which are distinguished by very good properties of fastness, especially by an excellent fastness to wet processing.

*Example 2*

7.82 parts of the potassium salt of 4-chloro-3-(N-methyl-N-ethionylamino)-1-aminobenzene of the formula

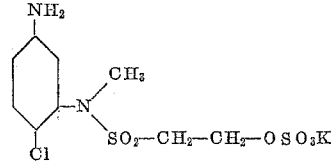

(obtainable by reacting 4-chloro-1-nitro-3-N-methyl-aniline with carbylsulfate and subsequent catalytic reduction, colorless crystal powder) are dissolved in 200 parts by volume of water. To the cold solution 20 parts by volume of 5 N-hydrochloric acid are added and the mixture is diazotized at 5° C. The diazonium salt solution is then adjusted to a pH-value of 6.8 by adding sodium bicarbonate and introduced into a solution of 6.34 parts of the sodium salt of 7-acetylamino-1-hydroxynaphthalene-3-sulfonic acid in 50 parts by volume of water. 5 parts of crystallized sodium acetate are added to the mixture which after coupling is salted out with potassium chloride. The red dyestuff obtained is filtered off, washed with dilute potassium chloride solution and dried in vacuo at 40° C. It dyes wool and cotton orange red tints of good properties of fastness.

*Example 3*

34 parts of the potassium salt of 3-N-ethionylamino-4-methoxy-1-aminobenzene of the formula

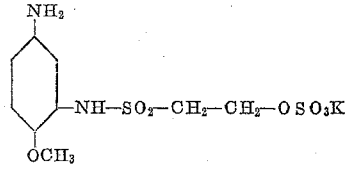

(obtainable by reacting 1-nitro-3-amino-4-methoxy-benzene with carbylsulfate and subsequent catalytic reduction) are dissolved in 380 parts by volume of water. 30 parts by volume of 5 N-hydrochloric acid and 85 parts of ice are added to the solution and the whole is diazotized at 0–5° C. The diazonium salt solution is then coupled with a solution containing in 95 parts by volume of water 31 parts of 1-(2'-methyl-6'-chloro-4'-sulfophenyl)-3-methyl-5-pyrazolone and 14.5 parts of sodium hydroxide solution of 33% strength. 35 parts of crystallized sodium acetate are then added. After coupling the dyestuff solution is evaporated in vacuo at 40° C. The brown-yellow dyestuff powder is readily soluble in water to give a yellow solution and dyes wool and cotton yellow tints of good properties of fastness.

*Example 4*

7.62 parts of the potassium salt of 4-(N-methyl-N-ethionylamino)-1-aminobenzene (obtainable by reacting 1-nitro-4-N-methylaniline with carbylsulfate and subsequent catalytic reduction, colorless powder melting at 220.5–221° C. with decomposition) are dissolved in a mixture of 100 parts by volume of water and 41 parts by volume of 2 N-hydrochloric acid and diazotized with sodium nitrite at 10° C. The diazonium salt solution is coupled in the course of 30 minutes at 10° C. with a solution of 4.17 parts of N,N'-di-acetoacetyl-4,4'-diamino-3,3'-dimethyldiphenyl and 2 parts of concentrated sodium hydroxide solution in a mixture of 44 parts by volume of water and 53 parts by volume of acetone. 5.6 parts of sodium acetate are then added and the mixture is stirred for 10 hours at 20° C. The dyestuff is salted out with potassium chloride, filtered off and dried in vacuo at 60° C. It dyes wool and cotton fast greenish yellow tints.

*Example 5*

The diazonium salt solution described in Example 4 is run into a solution containing, in 35 parts by volume of water, 7.75 parts of 1-(2'-methyl-6'-chloro-4'-sulfophenyl)-3-methyl-5-pyrazolone and 3.6 parts of sodium hydroxide solution of 33% strength. 5.7 parts of crystallized sodium acetate are then added and, after coupling, the dyestuff is salted out. A powder which dissolves in water to give a yellow solution is obtained. The dyestuff yields on silk or cotton yellow dyeings or prints.

*Example 6*

3.15 parts of the potassium salt of 2-amino-5-N-ethionylamino-1,4-dimethoxybenzene of the formula

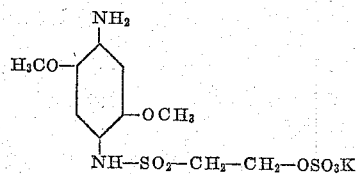

(obtainable by reacting 2-nitro-5-amino-1,4-dimethoxybenzene with carbylsulfate and subsequent catalytic reduction, dark powder) are dissolved in a mixture of 50 parts by volume of 2 N-hydrochloric acid and 100 parts by volume of water and diazotized at 0–5° C. with 8 parts by volume of 1 N-sodium nitrite solution. The diazonium salt solution is run at 10° C. into a solution containing, in 50 parts by volume of water, 2.25 parts of 1-(4'-sulfophenyl)-3-methyl-5-pyrazolone and 4 parts by volume of 2 N-sodium hydroxide solution. The coupling is completed by adding 2 parts of crystallized sodium acetate. When the coupling is complete, the dyestuff is salted out, filtered off and dried in vacuo at 40° C. A powder dissolving in water to give a yellow solution is obtained which dyes wool yellow tints of good properties of fastness.

*Example 7*

80 parts by volume of 2 N-hydrochloric acid are added to a solution of 16.7 parts of the potassium salt of 4-amino-2-N-ethionylamino-1-methylbenzene in 450 parts by volume of water and the whole diazotized at 5° C. When the diazotization is complete, the diazo solution is neutralized with sodium bicarbonate and coupled with a solution containing, in 100 parts by volume of water, 13.8 parts of the sodium salt of 7-acetylamino-1-hydroxynaphthalene-3-sulfonic acid and 10 parts of crystallized sodium acetate. After coupling the dyestuff is isolated and dried at 40° C. The orange red dyeings and prints on cotton possess an excellent fastness to washing.

The 4-amino-2-N-ethionylamino-1-methylbenzene used as diazo component can be prepared by reacting 4-nitro-2-amino-1-methylbenzene with carbysulfate and subsequent catalytic reduction. The compound is a colorless crystal powder.

*Example 8*

5.42 parts of the potassium salt of 3-(N-methyl-N-ethionylamino)-1-aminobenzene are dissolved in a mixture of 75 parts by volume of water and 30 parts by volume of 2 N-hydrochloric acid and diazotized at 10° C. When the diazotization is complete, the pH-value of the solution is adjusted to 6.5 by adding sodium bicarbonate. The diazo solution is then run at 15° C. into a solution of 9 parts of the sodium salt of 8-acetylamino-1-hydroxynaphthalene-3,6-disulfonic acid, and 3.7 parts of crystallized sodium acetate are added to the reaction mixture. After coupling the dyestuff is salted out with potassium chloride and isolated. A red powder is obtained which dyes wool and cotton brilliant red tints of good properties of fastness.

*Example 9*

100 parts by volume of 2 N-hydrochloric acid are added to a cold solution of 24.2 parts of the potassium salt of 3 - chloro - 6 - (N - methyl - N - ethionylamino) - 1-aminobenzene in 400 parts by volume of water and the whole is diazotized at 0–5° C. When the diazotization is complete, sodium bicarbonate is added to the solution of the diazonium salt until a p-H-value of 6.5 is attained. Into the solution of the diazonium salt there are strewed first 15.7 parts of the sodium salt of 1-hydroxynaphthalene-5-sulfonic acid and then 17 parts of crystallized sodium acetate. After coupling the crystallized dyestuff is filtered off, washed with potassium chloride solution and dried in vacuo at 40° C. It dyes cotton and wool red tints of very good fastness to wet processing.

The 3-chloro-6-(N-methyl-N-ethionlamino)-1-aminobenzene used as diazo component can be prepared by reacting 1-nitro-3-chloro-6-N-methylaniline with carbysulfate and subsequent catalytic reduction. It is a colorless crystal powder.

*Example 10*

A solution of 4 parts of the disodium salt of 8-acetylamino-1-hydroxynaphthalene-3,6-disulfonic acid in 30 parts by volume of water is run at 10° C. into the diazonium salt solution described in Example 6 and 2 parts of crystallized sodium acetate are added thereto. After coupling the dyestuff solution is evaporated in vacuo at 40–50° C. The dyestuff powder obtained dyes wool violet tints.

*Example 11*

3.9 parts of the potassium salt of 4-(N-butyl-N-ethionylamino)-1-aminobenzene (obtainable by reacting 1-nitro-4-N-butylaniline with carbysulfate and subsequent catalytic reduction, colorless crystal powder) are diazotized in a mixture of 100 parts by volume of water and 40 parts by volume of 2 N-hydrochloric acid. When the diazotization is complete, the hydrochloric acid in excess is neutralized by the addition of sodium bicarbonate until a pH-value of 6.8 is attained, and the mixture is coupled with a solution of 3.1 parts of the sodium salt of 7-acetylamino-1-hydroxynaphthalene-3-sulfonic acid in 25 parts by volume of water. 2.7 parts of crystallized sodium acetate are then added to the coupling mixture and the whole stirred at 20° C. until the coupling is complete. The red dyestuff is filtered off, washed with potassium chloride solution and dried in vacuo at 40° C. It yields on wool and cotton orange red dyeings or prints of good properties of fastness.

*Example 12*

25.2 parts of 6-chloro-3-aminobenzene-4-sulfonic acid-1-carboxylic acid in 100 parts by volume of water are neutralized with sodium hydroxide solution and 17.4 parts of a sodium nitrite solution of 40% strength are added. The diazotization is carried out at 0° C. by adding the above solution to a mixture of 28.6 parts of concentrated hydrochloric acid and 300 parts of water. A solution containing, in 500 parts by volume of water, 31.4 parts of the sodium salt of 1-(4'-N-methyl-N-ethionylaminophenyl)-3-methyl-5-pyrazolone and 20 parts of crystallized sodium acetate is run into the suspension of the diazo compound obtained as described above. The coupling mixture is adjusted to a pH-value of 6–6.5 by adding sodium carbonate. After coupling the dyestuff is salted out with sodium chloride and isolated. A yellow product is obtained which dyes wool and cotton yellow tints of very good fastness to wet processing.

The 1-(4'-N-methyl-N-ethionylaminophenyl)-3-methyl-5-pyrazolone used as coupling component which has the following formula

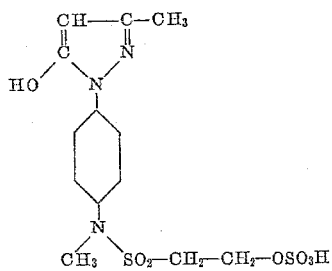

can be prepared by reacting 1-(4'-N-methylaminophenyl)-3-methyl-5-pyrazolone with carbylsulfate. It is a nearly colorless powder.

By using 34.8 parts of the potassium salt of 3-(N-methyl-N-ethionylamino)-1-aminobenzene- instead of 6-chloro-3-aminobenzene-4-sulfonic acid-1-carboxylic acid, a dyestuff of similar good properties of fastness is obtained.

*Example 13*

6.48 parts of 4-methyl-3-(N-methyl-N-ethionylamino)-1-aminobenzene (obtainable by reacting 1-nitro-4-methyl-3-N-methylaniline with carbylsulfate and subsequent catalytic reduction; colorless crystal powder) are dissolved in a mixture of 25 parts by volume of 2 N-hydrochloric acid and 50 parts of ice and diazotized by adding 4 parts by volume of 5 N-sodium nitrite solution. Into the diazonium salt solution so obtained 4.46 parts of 1-aminonaphthalene-2-sulfonic acid and subsequently 2.82 parts of crystallized sodium acetate are introduced. After coupling, the dyestuff is precipitated with sodium chloride and isolated. A brown powder which dissolves readily in water is obtained. It dyes silk orange tints of very good fastness to wet processing.

*Example 14*

5.32 parts of 2-(N-methyl-N-ethionylamino)-4-(3'-aminobenzoylamino)-1-methylbenzene of the following formula

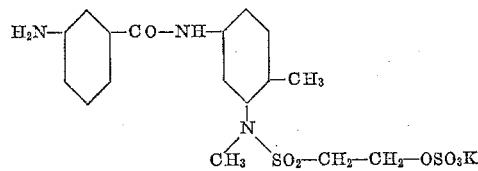

(obtainable by condensing 1-methyl-2-(N-methyl-N-ethionylamino)-4-aminobenzene with 3-nitrobenzoylchloride and subsequent catalytic reduction; colorless powder) are dissolved in the form of the potassium salt in a mixture of 200 parts by volume of water, 100 parts of ice and 30 parts by volume of 2 N-hydrochloric acid and diazotized with sodium nitrite. Into the diazo solution so obtained there are introduced 4.5 parts of 8-acetylamino-1-hydroxynaphthalene-3,6-disulfonic acid and subsequently sodium carbonate until a pH-value of 5.5 is attained. The dyestuff is salted out with sodium chloride, filtered off and dried in vacuo at 50° C. A red powder is obtained which readily dissolves in water to give a red solution. On cotton red dyeings of an excellent fastness to wet processing are obtained from salt containing baths in the presence of acid binding agents, such as sodium bicarbonate, sodium carbonate, trisodium phosphate or sodium hydroxide solution.

*Example 15*

20.8 parts of 3-(N-methyl-N-ethionylamino)-1-aminobenzene are dissolved in 200 parts by volume of water and 85 parts by volume of 2 N-hydrochloric acid and diazotized at 0–5° C. Into the diazo solution an aqueous solution of 33.7 parts of a monoazo-dyestuff is run which has been prepared by coupling in an acid medium diazotized sulfanilic acid with 8-amino-1-hydroxynaphthalene-3,6-disulfonic acid. By the addition of crystallized sodium acetate the pH-value of the solution is then adjusted to 4.3–4.5. After coupling the dyestuff solution is evaporated in vacuo at 50–60° C. A dark powder is obtained which dyes wool blue black to black tints of good properties of fastness.

*Example 16*

125 parts by volume of 2 N-hydrochloric acid are added to a cold solution of 38.25 parts of 3-chloro-6-(N-methyl-N-ethionylamino)-1-aminobenzene in 350 parts by volume of water and the mixture is then diazotized. Into this diazo solution there are introduced 23.9 parts of 7-amino-1-hydroxynaphthalene-3-sulfonic acid and subsequently 33 parts of crystallized sodium acetate. The dyestuff so obtained is salted out with sodium chloride and isolated. The red powder is readily soluble in water and dyes wool and cotton fast red tints.

*Example 17*

8.53 parts of 8-amino-1-hydroxynaphthalene-3,6-disulfonic acid are dissolved in 100 parts by volume of water and 2 parts by volume of sodium hydroxide solution of 33% strength and combined with a mixture of 50 parts of ice, 15 parts by volume of 2 N-hydrochloric acid and 100 parts by volume of water. Into the suspension so obtained half of a diazonium salt solution is run which has been prepared by diazotizing 17.22 parts of 4-chloro-3-(N-methyl-N-ethionylamino)-1-aminobenzene. By the introduction of sodium acetate the reaction mixture is maintained at a pH-value of 2. When the coupling in an acid medium is complete, the other half of the diazo solution is added and the pH-value is adjusted to 4.6–5.2 with sodium carbonate. The disazo-dyestuff so obtained is precipitated with potassium chloride and filtered off. It dyes wool blue black to black tints.

*Example 18*

12.96 parts of 4-methyl - 3 - (N-methyl-N-ethionylamino)-1-aminobenzene are dissolved in a mixture of 125 parts by volume of 2 N-hydrochloric acid, 200 parts of ice and 500 parts by volume of water and diazotized at 0–5° C. After the addition of 40 parts of crystallized sodium acetate to the diazonium salt solution so obtained, a solution of 25.3 parts of the product obtained by reacting nickelphthalocyanine-trisulfochloride with 3 mols of 1-(4'-aminophenyl)-3-methyl-5-pyrazolone in 450 parts by volume of water, 125 parts by volume of acetone and 7.5 parts by volume of a sodium hydroxide solution of 33% strength is run in, whereby the pH-value is maintained at 5.3–5.5 by simultaneously adding 43 parts by volume of a sodium carbonate solution of 10% strength. After coupling the dyestuff is salted out with sodium chloride. A bluish green powder is obtained which readily dissolves in water to give a green solution and yields on wool, cotton or polyamides green dyeings of good properties of fastness.

*Example 19*

2.53 parts of 1-aminobenzene-2,5-disulfonic acid are dissolved in a mixture of 10 parts by volume of water, 9 parts by volume of a sodium carbonate solution of 10% strength and 2 parts by volume of 5 N-sodium nitrite solution and added to a mixture of 25 parts by volume of 2 N-hydrochloric acid and 50 parts of ice. Into the diazo solution so obtained 4.8 parts of 1-(2',3'-hydroxynaphthoylamino)-3-N-methyl-N-ethionylamino) - benzene in the form of the sodium salt and subsequently 8 parts of crystallized sodium acetate and 1.5 parts of sodium carbonate are introduced. After coupling the dyestuff is precipitated with potassium chloride and isolated.

A red brown powder is obtained which yields when printed on cotton orange tints of very good fastness to washing.

The 1-(2',3'-hydroxynaphthoylamino)-3-(N-methyl-N-ethionylamino)-benzene used as coupling component which has the following formula

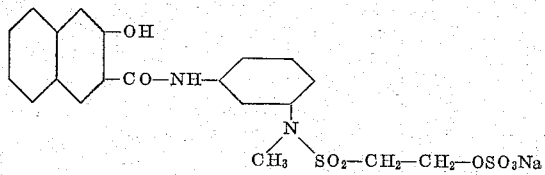

can be prepared by condensing 2-hydroxynaphthalene-3-carboxylic acid chloride with 3-(N-methyl-N-ethionylamino)-1-aminobenzene. It is a nearly colorless powder.

*Example 20*

6.96 parts of the potassium salt of 3-(N-methyl-N-ethionylamino)-1-aminobenzene are dissolved in a mixture of 100 parts by volume of water and 10 parts by volume of 5 N-hydrochloric acid and diazotized with sodium nitrite at 0–5° C. The diazonium salt solution so obtained is neutralized with sodium bicarbonate and added at 10–15° C. to a mixture of 10.6 parts of 1-(2',3'-hydroxynaphthoylamino)-3-(N - methyl-N-ethionylamino)-benzene and 100 parts by volume of water. The mixture is stirred for 1 hour and then mixed with 5.5 parts of crystallized sodium acetate. After coupling the dyestuff is filtered off, washed with a small amount of cold water and dried at 60° C. A powder dissolving in water to give a red solution is obtained which dyes wool red tints of a good to very good fastness to wet processing.

*Example 21*

A solution of 3.55 parts of diphenylamine in 4 parts by volume of dimethylformamide is slowly introduced at 5–10° C. into 20 parts by volume of water. The suspension so obtained is stirred for 30 minutes and the diazonium salt solution described in Example 20 is then added. After coupling the dyestuff is isolated and dried. A brownish yellow powder is obtained which dyes wool and polyamides yellow to orange tints of very good fastness to washing.

*Example 22*

17.3 parts of 1-aminobenzene-2-sulfonic acid are diazotized at 0–5° C. in a mixture of 300 parts by volume of water and 25 parts by volume of 2 N-hydrochloric acid with 20 parts by volume of 5 N-sodium nitrite solution. When the diazotization is complete, a solution of 51.7 parts of the di-potassium salts of 2-(N-methyl-N-ethionylamino)-8-hydroxynaphthalene-6-sulfonic acid in 400 parts by volume of water and then potassium bicarbonate is added until a pH-value of 6 is attained. The dyestuff obtained is salted out with potassium chloride and isolated. A red powder is obtained which dyes cotton reddish orange tints of good fastness properties.

*Example 23*

Into the diazo solution described in Example 22 there is run a solution of 51.7 parts of the di-potassium salt of 2-(N-methyl-N-ethionylamino) - 5 - hydroxynaphthalene-7-sulfonic acid in 400 parts by volume of water and potassium bicarbonate is introduced until a pH-value of 6 is attained. After coupling the dyestuff is salted out and isolated. An orange red powder is obtained which dyes cotton orange tints of good fastness properties.

*Example 24*

9.3 parts of aniline are diazotized at 0–5° C. in a mixture of 200 parts by volume of water and 25 parts by volume of 12 N-hydrochloric acid with 20 parts by volume of 5 N-sodium nitrite solution. When the diazotization is complete, a solution of 62.1 parts of the tripotassium salt of 1-N-ethionylamino-8-hydroxynaphthalene-3,6-disulfonic acid in 300 parts by volume of water is added and potassium bicarbonate is then introduced until a pH-value of 6 is attained. The dyestuff obtained is salted out with potassium chloride and isolated. A red brown powder is obtained which dyes cotton red tints of very good fastness to wet processing.

*Example 25*

50 parts of 2-aminonaphthalene-4,8-disulfonic acid are dissolved in 250 parts by volume of water and 20.5 parts of 5 N-sodium nitrite solution are added thereto. The solution obtained is introduced, while stirring, into a mixture of 250 parts of ice powder and 250 parts by volume of 2 N-hydrochloric acid. The diazonium salt solution is run at 0–10° C. into a solution of 51.2 parts of the potassium salt of 3-(N-methyl-N-ethionylamino)-1-aminobenzene in 250 parts by volume of water. By simultaneously adding 260 parts by volume of sodium acetate solution of 25% strength the pH-value is maintained at 3 to 3.5. After coupling the yellow-brown dyestuff solution is filtered and, by strewing in sodium carbonate, adjusted to a pH-value of 6 to 6.5. For benzoylating the aminoazo-dyestuff obtained, 20 parts of benzoylchloride and 82 parts by volume of sodium carbonate solution of 10% strength are run in at 0° to 5° C. and at a pH-value of 6.5 to 7.0. When the reaction is terminated, the product is precipitated with sodium chloride, filtered off, washed with dilute sodium chloride solution and dried in vacuo at 50 to 60° C. A yellow-brown powder is obtained which dyes cotton yellow tints of good fastness to light, to washing and to chlorine.

In a similar manner the dyestuffs indicated in the following table are obtained which yield on natural protein fibers, such as wool and silk, or on polyamide or polyurethane fibers, especially on cellulose materials, such as cotton, dyeings and prints of very good wet fastness properties.

| | Diazo component | Coupling component | Tint |
|---|---|---|---|
| 1 | 4-chloro-3-(N-methyl-N-ethionylamino)-1-amino-benzene | 1-(2'-methyl-6'-chloro-4'-sulfophenyl)-3-methyl-5-pyrazolone. | Greenish yellow. |
| 2 | ___do___ | 2-hydroxynaphthalene-3,6-disulfonic acid | Scarlet. |
| 3 | ___do___ | 8-acetylamino-1-hydroxynaphthalene-3,6-disulfonic acid | Red. |
| 4 | ___do___ | 1-hydroxynaphthalene-3-sulfonic acid | Orange. |
| 5 | ___do___ | 2-amino-8-hydroxynaphthalene-3,6-disulfonic acid | Scarlet. |
| 6 | ___do___ | 1-(2',3'-hydroxynaphthoylamino)-4-methoxybenzene | Red. |
| 7 | ___do___ | 2-phenylsulfonylamino-8-hydroxynaphthalene-6-sulfonic acid. | Scarlet. |
| 8 | 5-chloro-2-(N-methyl-N-ethionylamino)-1-aminobenzene | 1-(4',8'-disulfo-2'-naphthyl)-3-methyl-5-pyrazolone | Yellow. |
| 9 | ___do___ | 8-acetylamino-1-hydroxynaphthalene-3,5-disulfonic acid | Red. |
| 10 | ___do___ | 1-hydroxynaphthalene-4-sulfonic acid | Scarlet. |
| 11 | ___do___ | 6-acetylamino-1-hydroxynaphthalene-3-sulfonic acid | Orange. |
| 12 | 4-methyl-3-(N-methyl-N-ethionylamino)-1-aminobenzene | 2-aminonaphthalene-4,8-disulfonic acid | Yellow brown. |
| 13 | ___do___ | 1-amino-3-acetylaminobenzene-6-sulfonic acid | Yellow. |
| 14 | ___do___ | 2-acetoacetylaminobenzene-1-carboxylic acid | Do. |
| 15 | 4-(N-butyl-N-ethionylamino)-1-aminobenzene | 2-phenylamino-8-hydroxynaphthalene-6-sulfonic acid | Brown. |
| 16 | ___do___ | 2-methylamino-8-hydroxynaphthalene-6-sulfonic acid | Do. |
| 17 | ___do___ | 1-hydroxynaphthalene-3,6-disulfonic acid | Orange. |
| 18 | 3-(N-ethionylamino)-1-aminobenzene | 1-hydroxynaphthalene-3,6-disulfonic acid | Scarlet. |
| 19 | ___do___ | 8-acetylamino-1-hydroxynaphthalene-3,6-disulfonic acid | Red-violet. |
| 20 | 4-(N-methyl-N-ethionylamino)-1-aminobenzene | 8-benzoylamino-1-hydroxynaphthalene-3,6-disulfonic acid | Bluish red. |
| 21 | 4-(N-methyl-N-ethionylamino)-1-aminobenzene (2 mols) | 1-amino-8-hydroxynaphthalene-3,6-disulfonic acid | Blue. |
| 22 | 2,5-dimethoxy-4-(N-ethionylamino)-1-aminobenzene | 8-acetylamino-1-hydroxynaphthalene-3,6-disulfonic acid | Violet. |
| 23 | 1-amino-2-methoxybenzene-5-sulfonic acid | 1-(2',3'-hydroxynaphthoylamino)-3-(N-methyl-N-ethionylamino)-benzene. | Red. |
| 24 | 3-(N-ethionylamino)-1-aminobenzene | 1-aminobenzene-4-sulfonic acid $\xrightarrow{acid}$ 1-amino-8-hydroxynaphthalene-3,6-disulfonic acid. | Blue. |
| 25 | 1-amino-3-methyl-4-chlorobenzene-6-sulfonic acid | 1-(2',3'-hydroxynaphthoylamino)-3-(N-methyl-N-ethionylamino)-benzene. | Red. |
| 26 | 2-(N-methyl-N-ethionylamino)-4-(3'-aminophenylsulfonylamino)-1-methylbenzene. | 8-acetylamino-1-hydroxynaphthalene-3,6-disulfonic acid | Do. |
| 27 | 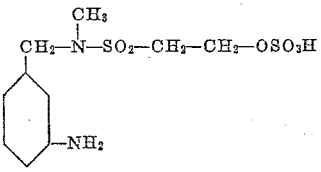 | 1-(4'-sulfophenyl)-3-methyl-5-pyrazolone | Greenish yellow. |
| 28 | 1-amino-4-chlorobenzene-5-carboxylic acid-2-sulfonic acid | 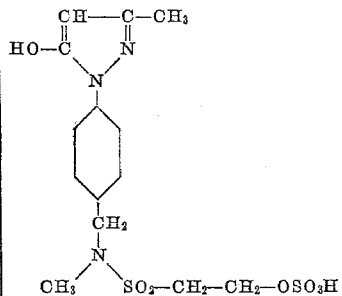 | Do. |
| 29 | 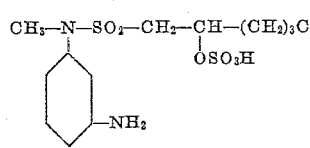 | 8-acetylamino-1-hydroxynaphthalene-3,6-disulfonic acid | Red. |
| 30 | 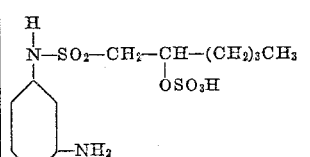 | 1-hydroxynaphthalene-3,6-disulfonic acid | Orange. |
| 31 | 4-amino-1-methoxybenzene-3-sulfonic acid | 2-(N-methyl-N-ethionylamino)-8-hydroxynaphthalene-6-sulfonic acid. | Red. |
| 32 | ___do___ | 2-(N-methyl-N-ethionylamino)-5-hydroxynaphthalene-7-sulfonic acid. | Scarlet. |
| 33 | 2-aminobenzene-1-carboxylic acid | 1-N-ethionylamino-8-hydroxynaphthalene-3,6-disulfonic acid. | Red. |
| 34 | 4-amino-azobenzene-3,4'-disulfonic acid | 2-(N-methyl-N-ethionylamino)-8-hydroxynaphthalene-6-sulfonic acid. | Scarlet. |
| 35 | 3-(N-methyl-N-ethionylamino)-1-aminobenzene-6-sulfonic acid | 2-acetylamino-8-hydroxynaphthalene-6-sulfonic acid | Red. |
| 36 | 4-(N-methyl-N-ethionylamino)-1-aminobenzene-6-sulfonic acid | 1-(4'-sulfophenyl)-3-methyl-5-pyrazolone | Yellow. |
| 37 | 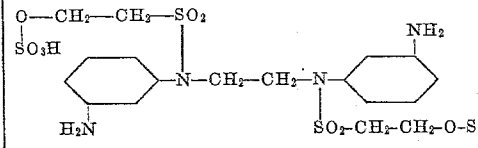 | 1-hydroxynaphthalene-5-sulfonic acid (2 mols) | Red. |
| 38 | 4-(N-methyl-N-ethionylamino)-1-aminobenzene | 8-acetylamino-1-hydroxynaphthalene-3,6-disulfonic acid | Do. |
| 39 | ___do___ | 1-hydroxynaphthalene-3,6-disulfonic acid | Scarlet. |

| | Diazo component | Coupling component | Tint |
|---|---|---|---|
| 40 | 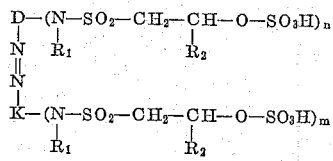 | 1-(4'-sulfophenyl)-5-pyrazolone-3-carboxylic acid (2 moles) | Yellow. |
| 41 | | 1-N-ethionylamino-8-hydroxynaphthlene-3,6-disulfonic acid (2 mols). | Red. |
| 42 | | 8-acetylamino-1-hydroxynaphthalene-3,6-disulfonic acid | Do. |
| 43 | 1-amino-2-methoxybenzene-5-sulfonic acid | 2-(N-methyl-N-ethionylamino)-5-hydroxynaphthalene-7-sulfonic acid | Scarlet. |
| 44 | 1-amino-3-methyl-4-chlorobenzene-6-sulfonic acid | ----do---- | Orange. |
| 45 | 1-amino-2-methoxybenzene-4-sulfonic acid | ----do---- | Scarlet. |
| 46 | 1-aminobenzene-3-sulfonic acid | 2-(N-methyl-N-ethionylamino)-5-hydroxynaphthalene-7-sulfonic acid | Orange. |
| 47 | 1-aminonaphthalene-2-sulfonic acid | ----do---- | Reddish orange. |
| 48 | 2-aminonaphthalene-3,6-disulfonic acid | 2-(N-methyl-N-ethionylamino)-8-hydroxynaphthalene-6-sulfonic acid | Red. |
| 49 | 4-amino-diphenylether-3-sulfonic acid | ----do---- | Do. |

We claim:
1. Azo-dyestuffs of the formula

$$D-(N-SO_2-CH_2-CH-O-SO_3H)_n$$
$$\underset{\substack{\|\\N\\\|\\N}}{\phantom{D}} \underset{R_1}{\phantom{(}} \underset{R_2}{\phantom{)}}$$
$$K-(N-SO_2-CH_2-CH-O-SO_3H)_m$$
$$\phantom{K-(}R_1\phantom{SO_2-CH_2-CH}R_2$$

wherein $R_1$ represents a lower alkyl of 1 to 5 carbon atoms and $R_2$ represents a member selected from the group consisting of hydrogen and lower alkyl groups of 1 to 5 carbon atoms; D represents a member selected from the group consisting of radicals of the benzene, azobenzene, benzoylaminophenyl, phenylsulfonylaminophenyl, naphthalene and diphenylether series; K represents the radical of a coupling component selected from the group consisting of radicals of the benzene, naphthalene, acetoaceticacidanilide, diphenylamine and pyrazolone series; $n$ is an integer from 0 to 2; $m$ is an integer from 0 to 1; and the sum of $n$ and $m$ is at least 1.

2. The azo-dyestuff of the following formula

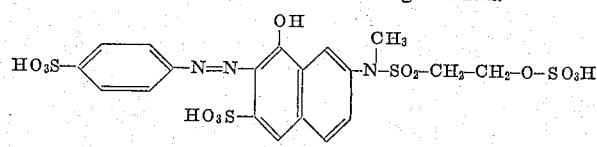

3. The azo-dyestuff of the following formula

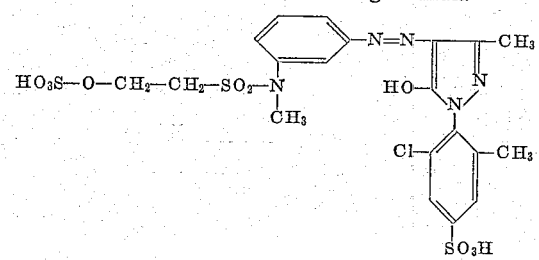

4. The azo-dyestuff of the following formula

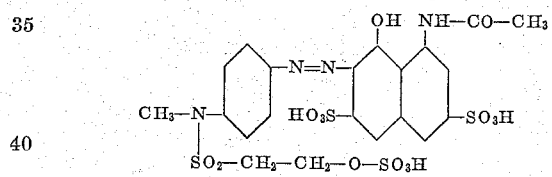

5. The azo-dyestuff of the following formula

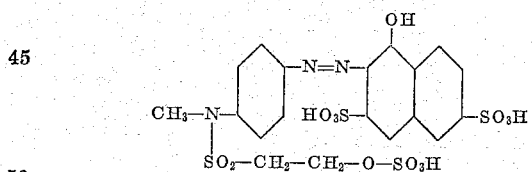

6. The azo-dyestuff of the following formula

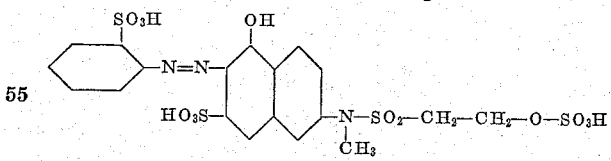

References Cited by the Examiner

UNITED STATES PATENTS

| 2,991,280 | 7/61 | Schetty et al. | 260—151 |
| 2,993,885 | 7/61 | Fasciati | 260—153 |
| 3,007,762 | 11/61 | Wegmann et al. | 260—151 |

FOREIGN PATENTS 594,108   3/60   Canada.

OTHER REFERENCES

Wegmann: Textil-Praxis, October 1958, pages 1056–1061.

CHARLES B. PARKER, *Primary Examiner.*